(12) United States Patent
Nakai et al.

(10) Patent No.: US 8,681,506 B2
(45) Date of Patent: Mar. 25, 2014

(54) MOTOR CONTROL DEVICE AND VEHICLE STEERING SYSTEM

(75) Inventors: Motoo Nakai, Nara (JP); Shigeki Nagase, Nabari (JP); Akira Sugimoto, Otsuki (JP)

(73) Assignees: JTEKT Corporation, Osaka (JP); Koyo Electronics Industries Co., Ltd., Tokyo (JP)

( * ) Notice: Subject to any disclaimer, the term of this patent is extended or adjusted under 35 U.S.C. 154(b) by 294 days.

(21) Appl. No.: 12/735,654

(22) PCT Filed: Feb. 2, 2009

(86) PCT No.: PCT/JP2009/051699
§ 371 (c)(1),
(2), (4) Date: Aug. 5, 2010

(87) PCT Pub. No.: WO2009/099026
PCT Pub. Date: Aug. 13, 2009

(65) Prior Publication Data
US 2010/0319976 A1      Dec. 23, 2010

(30) Foreign Application Priority Data
Feb. 7, 2008 (JP) .................................. 2008-028198

(51) Int. Cl.
H05K 1/14 (2006.01)
B62D 5/04 (2006.01)

(52) U.S. Cl.
CPC .................................... B62D 5/0406 (2013.01)
USPC ........................................... 361/736; 174/261

(58) Field of Classification Search
USPC ........... 174/250–262; 361/736, 748, 760, 766
See application file for complete search history.

(56) References Cited

U.S. PATENT DOCUMENTS

| | | | | |
|---|---|---|---|---|
| 4,621,701 A | * | 11/1986 | Takabayashi et al. | 180/444 |
| 5,693,993 A | * | 12/1997 | Ito et al. | 310/68 B |
| 6,304,014 B1 | * | 10/2001 | England et al. | 310/68 B |
| 6,747,448 B2 | * | 6/2004 | Berndt | 324/207.15 |
| 7,002,269 B2 | * | 2/2006 | Angerpointer | 310/68 R |
| 2002/0060105 A1 | | 5/2002 | Tominaga et al. | |
| 2004/0021463 A1 | * | 2/2004 | Miyazawa et al. | 324/252 |
| 2004/0212261 A1 | | 10/2004 | Uchiyama | |
| 2005/0270040 A1 | * | 12/2005 | Stridsberg | 324/662 |

FOREIGN PATENT DOCUMENTS

| | | |
|---|---|---|
| JP | 2002-044989 A | 2/2002 |
| JP | 2002-120739 A | 4/2002 |
| JP | 2002-345211 A | 11/2002 |
| JP | 2004-032900 A | 1/2004 |
| JP | 2004-182079 A | 7/2004 |
| JP | 2004-282990 A | 10/2004 |
| JP | 2005-278344 A | 10/2005 |
| JP | 2006-013373 A | 1/2006 |
| WO | WO-99/18653 A1 | 4/1999 |

OTHER PUBLICATIONS

Extended European Search Report issued on Nov. 7, 2012.

* cited by examiner

*Primary Examiner* — Yuriy Semenenko
(74) *Attorney, Agent, or Firm* — Rabin & Berdo, P.C.

(57) ABSTRACT

A motor control device comprising a control board for controlling driving of an electric motor, the control board including a multilayer circuit board having inner layers and outer layers, a ground pattern disposed around an output shaft of the electric motor formed on one of the inner layers, and a severed portion formed on a part of the ground pattern, so as to sever through the ground pattern in a radial direction of the output shaft. The construction reduces noise from the motor control device.

9 Claims, 5 Drawing Sheets

MOTOR CONTROL DEVICE AND VEHICLE STEERING SYSTEM

TECHNICAL FIELD

The present invention relates to a motor control device and a vehicle steering system using the same.

BACKGROUND ART

Driving of an electric motor is controlled by a motor control device (for example, refer to Patent Document 1).
Patent Document 1: Japanese Unexamined Patent Publication No. 2005-278344 A For further downsizing a motor control device and an electric motor, it is considered that the motor control device and the electric motor are disposed adjacent to each other. In detail, it is considered that the control device and the electric motor are juxtaposed in the axial direction of the motor, and the control device surrounds the motor output shaft. The circuit board of the control device is formed to have an annular shape so that the motor output shaft is inserted therein.

In this downsized motor control device, further noise reduction has been demanded. An object of the present invention is to achieve this.

SUMMARY OF THE INVENTION

Alphanumeric characters in parentheses shown below indicate reference numerals of corresponding components in the preferred embodiments described later, however, these reference numerals are not intended to limit the scope of claims.

A motor control device of the present invention includes a control board (31, 32) for controlling driving of an electric motor (18). The control board includes a multilayer circuit board having inner layers and outer layers, wherein a ground pattern (57) disposed around an output shaft of the electric motor (18) is formed on one of the inner layers, and on a part of the ground pattern (57), a severed portion (57c) is formed so as to sever through the ground pattern (57) in a radial direction of the output shaft.

According to the present invention, the ground pattern (57) is formed to have an arc-shaped shape due to the severed portion (57c), and therefore, a loop electric current as an electric current flowing circularly around the output shaft can be prevented from being generated in the ground pattern (57). As a result, electromagnetic noise that is caused by generation of a loop electric current can be prevented from being generated.

Preferably, the multilayer circuit board includes a power supply layer (52) as the inner layer, wherein an arc-shaped power supply pattern (56) disposed around the output shaft of the electric motor (18) is formed on the power supply layer (52), and on a part of the power supply pattern (56), a severed portion (56c) is formed so as to sever through the power supply pattern (56) in the radial direction of the output shaft.

In this case, the power supply pattern (56) is formed to have an arc-shaped shape due to the severed portion (56c), and accordingly, in the power supply pattern (56), a loop electric current as an electric current flowing circularly around the output shaft can be prevented from being generated. As a result, electromagnetic noise that is caused by generation of a loop electric current can be reliably prevented from being generated.

When the power supply pattern (56) is disposed so as to face the ground pattern (57), a capacitor is formed by the power supply pattern (56) and the ground pattern (57). By this capacitor, noise generated from the motor control device can be smoothed.

The severed portion (57c) formed on the ground pattern (57) and the severed portion (56c) formed on the power supply pattern (56) are preferably at substantially the same position in a plan view. By thus disposing at the same position the severed portions (57c and 56c) that do not contribute to formation of a capacitor, a facing area of the power supply pattern (56) and the ground pattern (57) can be enlarged and the capacity of the capacitor can be increased.

In the present invention, in some cases, the multilayer circuit board includes first and second multilayer circuit boards (31 and 32) spaced from each other, and at least a power supply circuit (69), a calculating circuit (71), and an analog signal interface circuit (70) are mounted on the first multilayer circuit board, at least a driver (77) for controlling switching elements (86U, 86V, and 86W), a communication circuit (76) for communication with the outside are mounted on the second multilayer circuit board. In this case, by forming separately from each other the first multilayer circuit board to which analog signals are input and the second multilayer circuit board to which digital signals are input, noise that intrudes into the first multilayer circuit board from the second multilayer circuit board can be reduced, and noise can be prevented from mixing in analog signals.

The present invention provides a vehicle steering system (4) including the above-described motor control device. In this case, a vehicle steering system that is hardly influenced by electromagnetic noise can be realized.

The above-described and other advantages, features, and effects of the present invention will become more apparent from the following description of preferred embodiments with reference to the attached drawings.

DESCRIPTION OF REFERENCE NUMERALS

1: Electric power steering device (vehicle steering system), 18: Electric motor, 29: Motor control device, 30: Output shaft, 31: First multilayer circuit board (control board), 32: Second multilayer circuit board (control board), 52: Second layer (power supply layer), 53: Third layer (ground layer), 56: Power supply pattern, 57: Ground pattern, 69: Power supply circuit, 70: Analog signal I/F circuit, 71: Calculating circuit, 76: Communication circuit, 77: FET driver, 86U, 86V, 86W: Switching element

DETAILED DESCRIPTION OF EMBODIMENTS

Figure 1:
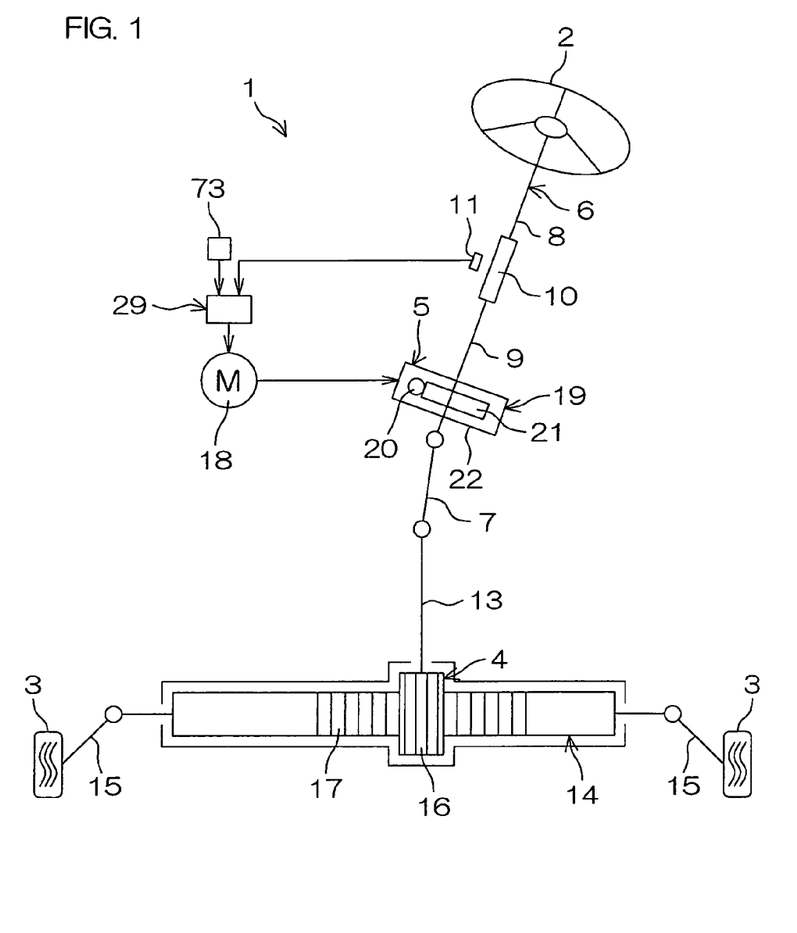
FIG. 1 is a schematic view showing a general configuration of an electric power steering device with a motor control device according to a preferred embodiment of the present invention.

FIG. 1 is a schematic view showing a general configuration of an electric power steering device 1 as a vehicle steering system with a motor control device according to a preferred embodiment of the present invention.

Referring to FIG. 1, the electric power steering device 1 includes a steering member 2 such as a steering wheel, a steered mechanism 4 for turning wheels 3 in conjunction with rotation of the steering member 2, and a steering assisting mechanism 5 that assists driver's steering. As a steered mechanism 4, for example, a rack-and-pinion mechanism is used.

The steering member 2 and the steered mechanism 4 are coupled mechanically to each other via a steering shaft 6 and an intermediate shaft 7, etc. Rotation of the steering member 2 is transmitted to the steered mechanism 4 via the steering shaft 6 and the intermediate shaft 7, etc. The rotation transmitted to the steered mechanism 4 is converted into axial movement of a rack shaft 14 described later. Accordingly, the turning wheels 3 are turned.

The steering shaft 6 extends straight, and includes an input shaft 8 coupled to the steering member 2 and an output shaft 9 coupled to the intermediate shaft 7. The input shaft 8 and the output shaft 9 are coupled rotatably relative to each other on the same axis via a torsion bar 10. Specifically, when a steering torque exceeding a predetermined value is input into the steering member 2, the input shaft 8 and the output shaft 9 rotate in the same direction while rotating relative to each other.

A torque sensor 11 disposed around the steering shaft 6 detects a steering torque input into the steering member 2 based on a relative rotation displacement amount of the input shaft 8 and the output shaft 9. A torque detection result of the torque sensor 11 is input into the motor control device 29. The intermediate shaft 7 couples the steering shaft 6 and the steered mechanism 4.

The steered mechanism 4 includes a pinion shaft 13 and a rack shaft 14. To the end portions of the rack shaft 14, the turning wheels 3 are coupled via tie rods 15 and knuckle arms (not shown). The pinion shaft 13 is coupled to the intermediate shaft 7, and rotates in conjunction with steering of the steering member 2. A pinion 16 is coupled to the tip end (lower end in FIG. 1) of the pinion shaft 13.

The rack shaft 14 extends straight along the right-left direction of the vehicle. At the middle portion in the axial direction of the rack shaft 14, a rack 17 that engages with the pinion 16 is formed. By the pinion 16 and the rack 17, the rotation of the pinion shaft 13 is converted into axial movement of the rack shaft 14. By moving the rack shaft 14 in the axial direction, the turning wheels 3 can be steered.

The steering assisting mechanism 5 includes a steering assisting electric motor 18, a reduction gear mechanism 19 that decelerates output rotation of the electric motor 18, and the motor control device 29 that controls driving of the electric motor 18. As the electric motor 18, for example, a three-phase brushless motor is used. The reduction gear mechanism 19 includes a worm shaft 20 as a drive gear and a worm wheel 21 as a driven gear that engages with the worm shaft 20.

The worm shaft 20 is coupled to an output shaft (not shown) of the electric motor 18 via a power transmission joint not shown. The worm wheel 21 is coupled rotatably together with the output shaft 9 of the steering shaft 6.

When the electric motor 18 drives and rotates the worm shaft 20, the worm wheel 21 is driven to rotate by the worm shaft 20, and the worm wheel 21 and the output shaft 9 rotate together. Accordingly, an output of the electric motor 18 as a steering assist force is transmitted to the steered mechanism 4 and driver's steering is assisted.

The motor control device 29 controls driving of the electric motor 18 based on a torque detection result from the torque sensor 11 and a vehicle speed detection result from a vehicle speed sensor 73, etc.

Figure 2:
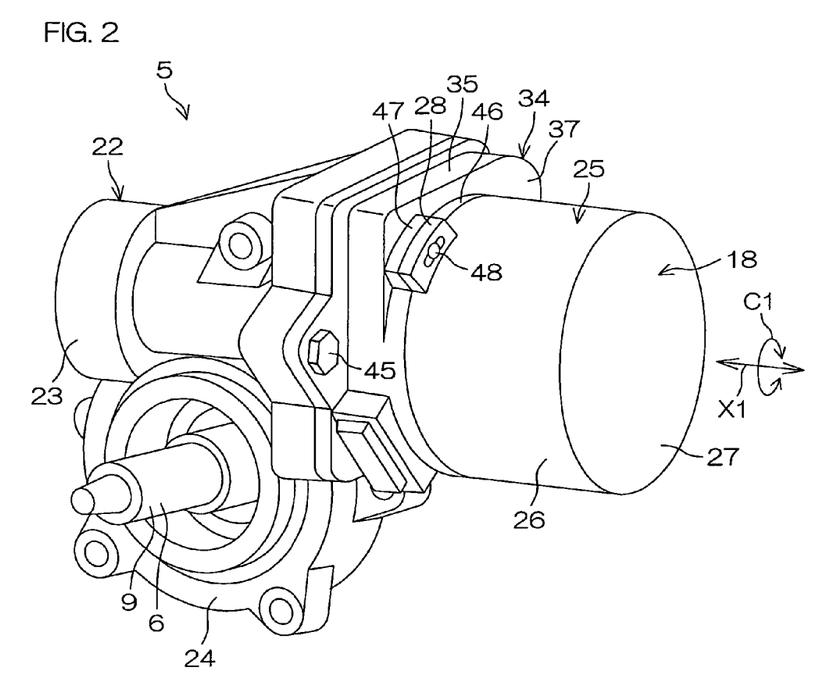
FIG. 2 is an illustrated external view of a steering assisting mechanism.

FIG. 2 is an illustrated external view of the steering assisting mechanism 5. Referring to FIG. 1 and FIG. 2, the reduction gear mechanism 19 is housed in a gear housing 22 as a transmission housing.

The gear housing 22 is formed by using, for example, an aluminum alloy, and includes a drive gear housing portion 23 housing the worm shaft 20 and a driven gear housing portion 24 housing the worm wheel 21. The output shaft 9 of the steering shaft 6 is inserted through an insertion hole of the driven gear housing portion 24.

On the other hand, the electric motor 18 has a cup-shaped motor housing 25. The motor housing 25 is formed by using, for example, iron, and includes a cylindrical peripheral wall portion 26, an end wall 27 closing one end of the peripheral wall portion 26, and arc-shaped flange portions 28 projecting radially outward from the other end of the peripheral wall portion 26. Two flange portions 28 are provided at, for example, even intervals in the circumferential direction C1 of the electric motor 18.

The motor housing 25 is coupled to the gear housing 22 via a control housing 34 described later. Specifically, between the gear housing 22 and the motor housing 25, the control housing 34 is interposed. The control housing 34 neighbors the electric motor 18 in the axial direction X1 of the electric motor 18.

Hereinafter, the axial direction X1 of the electric motor 18 is simply referred to as "axial direction X1," and the circumferential direction C1 of the electric motor 18 is simply referred to as "circumferential direction C1."

Figure 3:
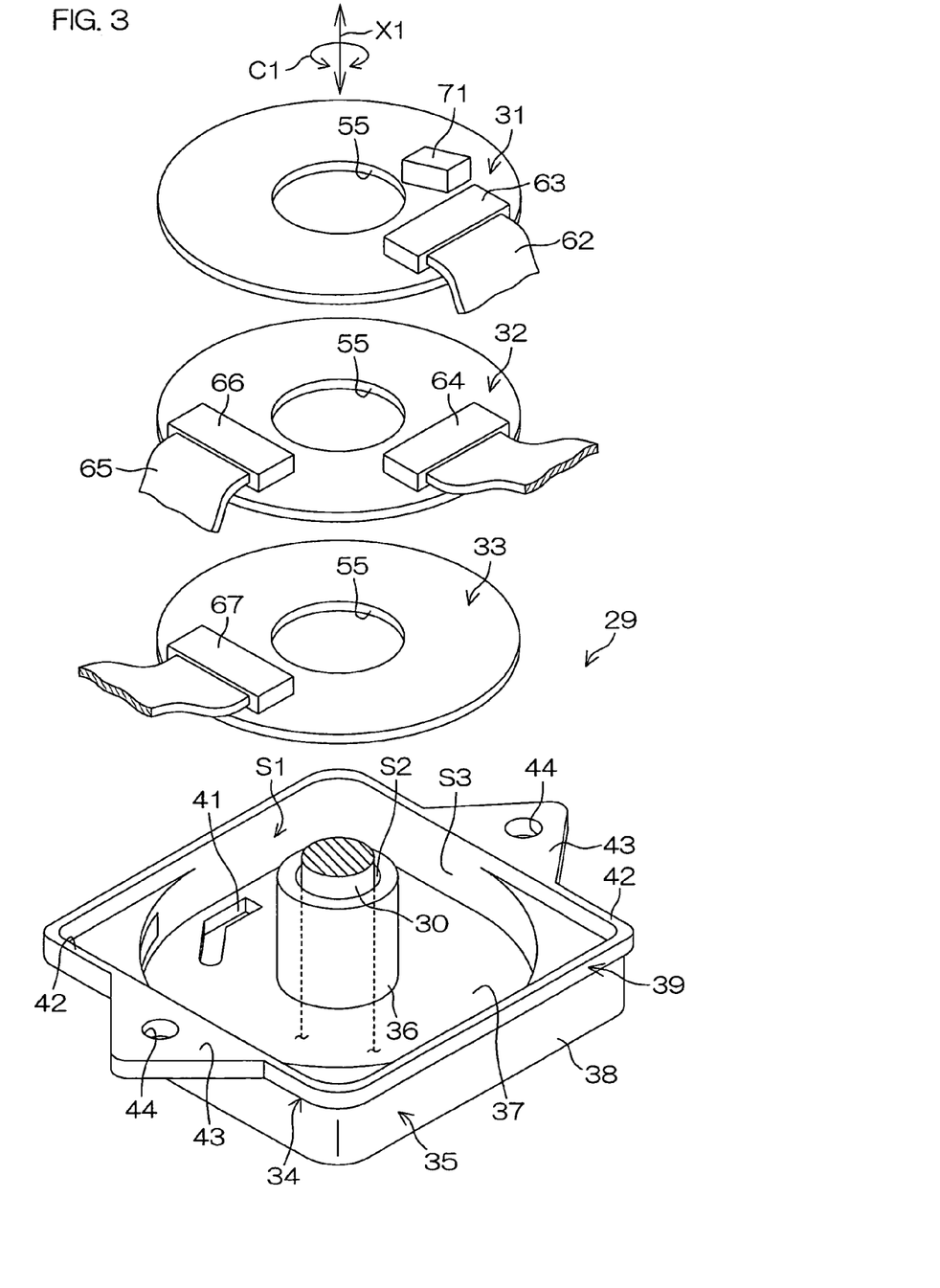
FIG. 3 is an illustrated exploded perspective view of the motor control device.

FIG. 3 is an illustrated exploded perspective view of the motor control device 29. Referring to FIG. 3, the motor control device 29 includes a first multilayer circuit board 31, a second multilayer circuit board 32, a driving circuit board 33, and a control housing 34 as a housing for housing these circuit boards 31 to 33.

The control housing 34 is formed by using, for example, an aluminum alloy, and is a substantially quadrilateral box-shaped member one end of which is open. The control housing 34 includes a main body portion 35 and a tubular portion 36. The main body portion 35 and the tubular portion 36 are formed integrally from a single member.

The main body portion 35 includes a bottom wall 37, an outer peripheral wall 38 having a substantially quadrilateral tubular shape provided on the outer peripheral edge portion of the bottom wall 37, and an annular flange 39 projecting toward the outside of the main body portion 35 from one end (upper end in FIG. 3) of the outer peripheral wall 38. The tubular portion 36 is erected from the central portion of the bottom wall 37 and extends toward the open side of the main body portion 35. The tubular portion 36 is surrounded by the outer peripheral wall 38.

An accommodation chamber S1 is formed inside the outer peripheral wall 38. The accommodation chamber S1 includes a central space S2 formed inside the tubular portion 36 and a peripheral space S3 that is formed between the outer peripheral wall 38 and the tubular portion 36 and surrounds the central space S2. The tubular portion 36 constitutes a partition member that partitions the central space S2 and the peripheral space S3.

In the central space S2, the output shaft 30 of the electric motor 18 is disposed. Specifically, the output shaft 30 of the electric motor 18 is inserted through the inside of the tubular portion 36. Circuit boards 31 to 33 are accommodated in the peripheral space S3.

A flange 39 includes an annular portion 42 along one end of the outer peripheral wall 38 and a plurality of (for example, a pair of) attaching portions 43 projecting toward the outside of the main body portion 35 from a part of the annular portion 42. In each attaching portion 43, a positioning hole 44 is formed to penetrate through the attaching portion 43 in its thickness direction.

Referring to FIG. 2 and FIG. 3, the control housing 34 is fixed to the gear housing 22 by a fixing bolt 45 inserted through the positioning hole 44. Referring to FIG. 2, on the bottom wall 37 of the control housing 34, an annular butting portion 46 extending toward the motor housing 25 side is provided. On this butting portion 46, arc-shaped flange portions 47 are provided at positions corresponding to the flange portions 28 of the motor housing 25. These flange portions 28 and 47 are fixed to each other by using fixing bolts 48.

Figure 4:
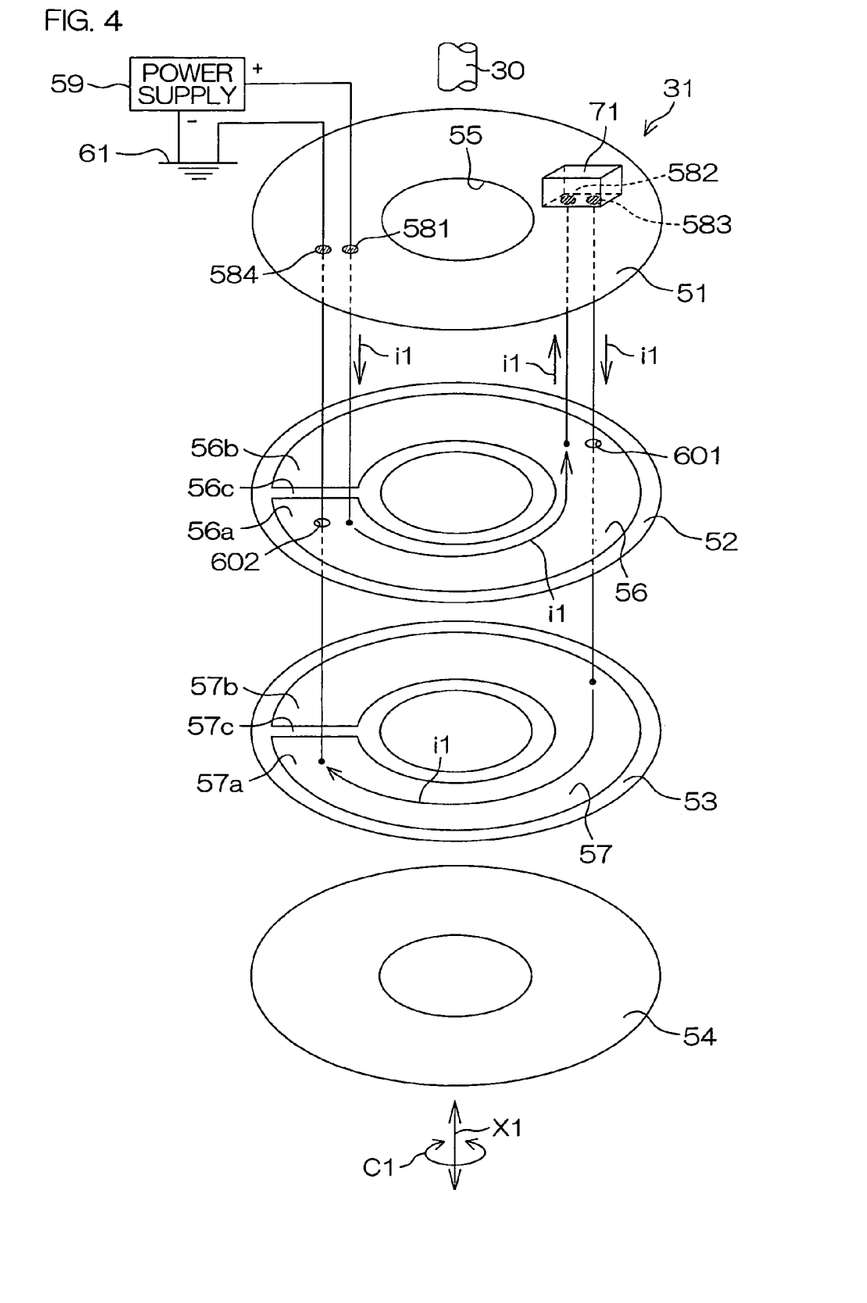
FIG. 4 is a schematic perspective view showing a configuration of an essential portion of a first multilayer circuit board.

FIG. 4 is a schematic perspective view showing a configuration of essential members of the first multilayer circuit board 31. Referring to FIG. 4, the first multilayer circuit board 31 is a multilayer circuit board formed by laminating a plurality of ring-shaped layers in which circular through holes are formed, and the layers are formed of thin substrates made of an insulator or a dielectric material. The first multilayer circuit board 31 includes, for example, first to fourth layers 51 to 54. The outer peripheral edge portion of the first multilayer circuit board 31 may be formed rectangular.

This first multilayer circuit board 31 is formed by laminating the first layer 51, the second layer 52, the third layer 53, and the fourth layer 54 in order in the axial direction X1. Specifically, between the first layer 51 and the fourth layer 54 as outer layers, the second layer 52 and the third layer 53 as inner layers are laminated. The second layer 52 functions as a power supply layer, and the third layer 53 functions as a ground layer.

The through holes of the layers 51 to 54 are formed at the centers in the radial direction of the corresponding layers 51 to 54, and are communicatively connected to each other. These through holes constitute a through hole 55 of the first multilayer circuit board 31.

The surface of the first layer 51 constitutes the surface of the first multilayer circuit board 31.

On the surface of the second layer 52, a conductive power supply pattern 56 having a thin film shape is formed. As viewed along the axial direction X1, that is, in a plan view, the power supply pattern 56 has a "C" shape that is an arc shape. In other words, the power supply pattern 56 has an open-ended annular shape surrounding the through hole 55 and is disposed around the output shaft 30.

Between one end portion 56a and the other end portion 56b in the circumferential direction of the power supply pattern 56, a severed portion 56c is formed to penetrate through the power supply pattern 56 in the radial direction. The power supply pattern 56 is not present at this severed portion 56c, so that no electric current flows between the one end portion 56a and the other end portion 56b.

The shortest distance between the one end portion 56a and the other end portion 56b in the circumferential direction of the power supply pattern 56 is properly set so as at least not to cause an electric current short-circuit between these. In the radial direction of the second layer 52, the power supply pattern 56 is formed on most of the second layer 52 except for the inner peripheral edge portion and the outer peripheral edge portion of the second layer 52.

On the surface of the third layer 53, a conductive ground pattern (GND pattern) 57 having a thin film shape is formed. As viewed along the axial direction X1, that is, in a plan view, the ground pattern 57 has a "C" shape that is an arc shape. In other words, the ground pattern 57 has an open-ended annular shape surrounding the through hole 55 and is disposed around the output shaft 30.

Between one end portion 57a and the other end portion 57b in the circumferential direction of the ground pattern 57, a severed portion 57c is formed to penetrate through the ground pattern 57 in the radial direction. The ground pattern 57 is not present at this severed portion 57c, so that no electric current flows between the one end portion 57a and the other end portion 57b. The shortest distance between the one end portion 57a and the other end portion 57b in the circumferential direction of the ground pattern 57 is properly set so as at least not to cause an electric current short-circuit between these. In the radial direction of the third layer 53, the ground pattern 57 is formed on most of the third layer 53 except for the inner peripheral edge portion and the outer peripheral edge portion of the third layer 53.

By thus forming the ground pattern 57 on most of the third layer 53 and forming the power supply pattern 56 on most of the second layer 52, the capacity of the capacitor to be formed between the power supply pattern 56 and the ground pattern 57 can be increased.

The severed portion 57c formed on the ground pattern 57 and the severed portion 56c formed on the power supply pattern 56 are preferably at substantially the same position as viewed along the axial direction X1, that is, in a plan view. By thus disposing the severed portions 57c and 56c that do not contribute to formation of the capacitor at the same position, the facing area of the power supply pattern 56 and the ground pattern 57 can be maximized and the capacity of the capacitor can be maximized.

The back surface of the fourth layer 54 constitutes the back surface of the first multilayer circuit board 31.

Layers adjacent to each other in the axial direction X1 of the first to fourth layers 51 to 54 are fixed to each other.

In the first layer 51, through holes 581 to 584 are formed to penetrate through the first layer 51.

A conductor is inserted through the through hole 581. This conductor is electrically connected to the positive pole of a power supply 59 such as a battery, and electrically connected to one end portion 56a of the power supply pattern 56 of the second layer 52.

A conductor is inserted through the through hole 582. This conductor is electrically connected to the substantially intermediate portion between one end portion 56a and the other end portion 56b in the circumferential direction C1 of the power supply pattern 56 of the second layer 52.

A conductor is inserted through the through hole 583. This conductor is electrically connected to the substantially intermediate portion between the one end portion 57a and the other end portion 57b in the circumferential direction C1 of the ground pattern 57 of the third layer 53 through the inside of the through hole 601 penetrating through the power supply pattern 56 of the second layer 52.

A calculating circuit 71, etc., described later mounted on the surface of the first layer 51 are electrically connected to the conductor inside the through hole 582 and the conductor inside the through hole 583.

A conductor is inserted through the through hole 584. This conductor is connected to the one end portion 57a of the ground pattern 57 of the third layer 53 through the inside of the through hole 602 penetrating through the power supply pattern 56 of the second layer 52, and electrically connected to a negative pole of the power supply 59 via a vehicle body 61 as a ground potential.

Referring to FIG. 3 and FIG. 4, the second multilayer circuit board 32 has substantially the same configuration as that of the first multilayer circuit board 31 except that different components are mounted such as an FET driver 77 described later mounted instead of the calculating circuit 71, so that detailed description of the second multilayer circuit board 32 will be omitted.

Similarly, the driving circuit board 33 has substantially the same configuration as that of the first multilayer circuit board 31 except that different components are mounted such as switching elements 86 described later mounted instead of the calculating circuit 71, so that detailed description of the driving circuit board 33 will be omitted.

Referring to FIG. 3, the circuit boards 31 to 33 are disposed at intervals along the axial direction X1, and accommodated in the peripheral space S3 of the accommodation chamber S1. The circuit boards 31 to 33 are arranged in the order of the first multilayer circuit board 31, the second multilayer circuit board 32, and the driving circuit board 33 along the axial direction X1. The first multilayer circuit board 31 and the second multilayer circuit board 32 constitute control boards for controlling driving of the electric motor 18.

The tubular portion 36 and the output shaft 30 of the electric motor 18 are inserted through the through holes 55 of the circuit boards 31 to 33. The circuit boards 31 to 33 are fixed to the control housing 34 by using fixing members such as screw members, etc., not shown.

The first multilayer circuit board 31 and the second multilayer circuit board 32 are electrically connected to each other via a band-shaped flexible board 62 and connectors 63 and 64 provided on both end portions of the flexible board 62.

The second multilayer circuit board 32 and the driving circuit board 33 are electrically connected to each other via a band-shaped flexible board 65 and connectors 66 and 67 provided on both end portions of the flexible board 65.

Figure 5:
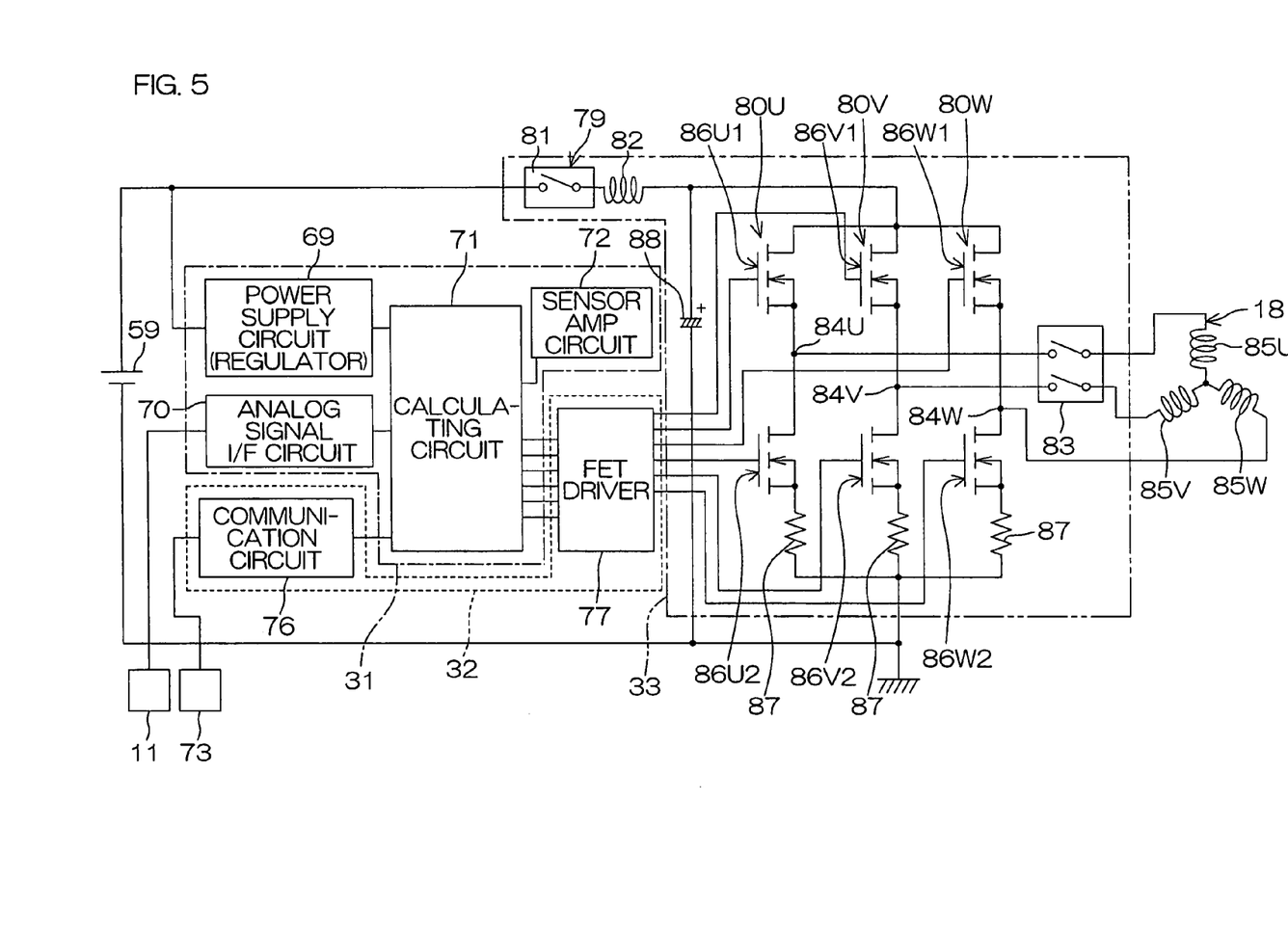
FIG. 5 is a block diagram showing an essential portion of an electric configuration of the motor control device.

FIG. 5 is a block diagram showing an essential portion of an electric configuration of the motor control device 29. Referring to FIG. 3 and FIG. 5, the first multilayer circuit board 31 includes a power supply circuit 69, an analog signal I/F (interface) circuit 70, a calculating circuit 71, and a sensor AMP circuit 72.

The power supply circuit 69 is connected to the power supply 59, and is supplied with electric power from the power supply 59.

The analog signal I/F circuit 70 is connected to a torque sensor 11, and receives an input of a predetermined analog signal as a signal concerning a steering torque from the torque sensor 11.

The calculating circuit 71 includes a CPU, a ROM, and a RAM, etc., and calculates electric energy to be supplied to the electric motor 18 based on signals, etc., from the torque sensor 11 and the vehicle speed sensor 73. The calculating circuit 71 is connected to the power supply circuit 69, the analog signal I/F circuit 70, and a sensor AMP circuit 72.

The first multilayer circuit board 31 and the second multilayer circuit board 32 are control circuits for controlling electric power to be supplied to the electric motor 18. The second multilayer circuit board 32 includes a communication circuit 76 and an FET driver 77.

The communication circuit 76 is connected to the vehicle speed sensor 73, and receives an input of a digital signal (pulse signal) from the vehicle speed sensor 73. The communication circuit 76 is connected to the calculating circuit 71.

The FET driver 77 controls driving of switching elements 86U to 86W described later. This FET driver 77 is connected to the calculating circuit 71. The FET driver 77 receives an input of a digital signal from the calculating circuit 71.

The driving circuit board 33 is for driving the electric motor 18, and includes a relay device 79 as a power supply relay and three series circuits 80U, 80V, and 80W connected parallel to each other.

The relay device 79 includes a switch 81. One end of the switch 81 is connected to the positive pole of the power supply 59. The other end portion of the switch 81 is connected to one end portions of the series circuits 80U, 80V, and 80W via a coil 82. The coil 82 has one end portion connected to the other end portion of the switch 81, and the other end portion connected to one end portions of the series circuits 80U, 80V, and 80W and one end portion of the capacitor 88. The other end portion of the capacitor 88 is connected to the negative pole of the power supply 59. These coil 82 and capacitor 88 constitute a noise filter.

The driving circuit board 33 is provided with a relay 83 as a motor relay. The relay 83 is interposed between the connection point 84U described later of the series circuit 80U and a U-phase coil 85U of the electric motor 18 and between the connection point 84V described later of the series circuit 80V and a V-phase coil 85V of the electric motor 18.

When the switch 81 is turned on, the power supply 59 is connected to the series circuits 80U, 80V, and 80W.

The series circuit 80U is formed by connecting switching elements 86U1 and 86U2 including FET in series, and a drain of one switching element 86U1 is connected to the coil 82. Similarly, the series circuit 80V is formed by connecting switching elements 86V1 and 86V2 in series, and a drain of one switching element 86V1 is connected to the coil 82. The series circuit 80W is formed by connecting switching elements 86W1 and 86W2 in series, and a drain of one switching element 86W1 is connected to the coil 82.

The series circuit 80U is connected to the U-phase coil 85U of the electric motor 18 at the connection point 84U of the two switching elements 86U1 and 86U2. Similarly, the series circuit 80V is connected to the V-phase coil 85V of the electric motor 18 at the connection point 84V of the two switching elements 86V1 and 86V2. Similarly, the series circuit 80W is connected to the W-phase coil 85W of the electric motor 18 at the connection point 84W of the two switching elements 86W1 and 86W2.

The sources of the other switching elements 86U2, 86V2 and 86W2 of the series circuits 80U, 80V, and 80W are connected to the power supply 59 via corresponding resistors 87, respectively.

The gates of the switching elements 86U1 to 86W2 are connected to the FET driver 77.

In the electric power steering device 1 having the above-described general configuration, the calculating circuit 71 sets target electric current values of electric currents that should flow to the respective phase coils 85U, 85V, and 85W of the electric motor 18 based on output signals of the torque sensor 11 and the vehicle speed sensor 73.

Next, based on deviations between the respective phase target electric current values and respective phase electric current values actually flowing in the respective phase coils 85U, 85V, and 85W, the calculating circuit 71 generates PWM (Pulse Width Modulation) signals for the respective phases of the electric motor 18, and inputs the respective phase PWM signals into the switching elements 86U1 to 86W2 of the series circuits 80U to 80W via the FET driver 77.

Accordingly, the switching elements 86U1 to 86W2 are turned on/off according to duties of the PWM signals input into the switching elements 86U1 to 86W2. As a result, an electric current according to the steering torque and the vehicle speed flows into the electric motor 18 to generate a steering assist force.

The electric current i1 flowing at this time in the calculating circuit 71 follows, for example, the path shown in FIG. 4. Specifically, the electric current i1 from the power supply 59 flows to the power supply pattern 56 of the second layer 52 through the conductor inside the through hole 581 of the first layer 51. Further, the electric current i1 flows in the power supply pattern 56 along the circumferential direction C1, and flows from the conductor inside the through hole 582 into the calculating circuit 71. The electric current i1 that has flowed out of the calculating circuit 71 flows to the ground pattern 57 through the conductor inside the through hole 583. Further, in the ground pattern 57, the electric current i1 flows along the circumferential direction C1, and flows from one end 57a of the ground pattern 57 to the power supply 59 through the conductor inside the through hole 584 and the vehicle body 61, etc.

In the above configuration, the power supply pattern 56 has an open-ended annular shape, so that the electric current i1 flowing in the power supply pattern 56 is not loop-like. Similarly, the ground pattern 57 has an open-ended annular shape, so that the electric current flowing in the ground pattern 57 is not loop-like.

As described above, according to the present preferred embodiment, in each of the circuit boards 31 to 33, the power supply pattern 56 is formed to have an arc shape and a severed portion 56c is formed, and accordingly, in the power supply pattern 56, a loop electric current flowing circularly around the output shaft 30 can be prevented from being generated. As a result, electromagnetic noise that is caused by a loop electric current can be prevented from being generated.

In each of the circuit boards 31 to 33, the ground pattern 57 is formed to have an arc shape and a severed portion 57c is formed, and accordingly, a loop electric current flowing circularly around the output shaft 30 can be prevented from being generated in the ground pattern 57. As a result, electromagnetic noise that is caused by a loop electric current can be more reliably prevented from being generated.

Further, the output shaft 30 of the electric motor 18 can be disposed inside the through holes 55 of the circuit boards 31 to 33, and the space to be occupied by the motor control device 29 and the electric motor 18 can be made smaller.

Further, the first multilayer circuit board 31 into which an analog signal is input and the second multilayer circuit board 32 into which a digital signal is input are formed separately, and accordingly, noise to intrude into the first multilayer circuit board 31 from the second multilayer circuit board 32 can be reduced, and noise can be prevented from mixing in the analog signal.

In each of the circuit boards 31 to 33, the second layer 52 and the third layer 53 are disposed adjacent to each other, so that a capacitor can be formed between the second layer 52 and the third layer 53. By this capacitor, noise generated in the power supply pattern 56 of the second layer 52 and noise generated in the ground pattern 57 of the third layer 53 can be canceled out. Accordingly, influence of the noise on the motor control device 29 can be further reduced.

Accordingly, an electric power steering device 1 that is hardly influenced by electromagnetic noise can be realized.

Further, by disposing the circuit boards 31 to 33 close to each other so as to overlap each other in the axial direction X1 inside the control housing 37, while the circuit boards 31 to 33 are reduced in diameter and downsized, sufficient mounting areas can be secured. As a result, the control housing 34 housing the circuit boards 31 to 33 can be downsized.

The present invention is not limited to the contents of the preferred embodiment described above, but can be variously changed within the scope of the claims.

For example, the shape of each of the circuit boards 31 to 33 is not limited to the annular shape, but may be an arc shape such as a semicircular shape, a ¼ circular shape, or a fan shape. The disposition of the second layer (power supply layer) 52 and the third layer (ground layer) 53 may be reversed.

For example, in the preferred embodiment described above, an example in which the present invention is applied to a column-assist type electric power steering device is described, however, without limiting to this, the present invention can also be applied to other types of electric power steering devices such as a pinion-assist type electric power steering device and a rack-assist type electric power steering device.

In the preferred embodiment described above, an example in which the present invention is applied to an electric power steering device that outputs an output of the electric motor as a steering assist force, however, without limiting to this, the present invention can also be applied to a transmission ratio variable vehicle steering system that includes a transmission ratio variable mechanism capable of varying the ratio of the steered angle of turning wheels to the steering angle of the steering member and uses an output of the electric motor for driving the transmission ratio variable mechanism, and a steer-by-wire type vehicle steering system that steers the turning wheels by an output of the electric motor upon releasing mechanical coupling between the steering member and the turning wheels.

In the preferred embodiment described above, an example using a brushless motor as the electric motor 18 is described, however, without limiting to this, a motor other than the brushless motor may be used as the electric motor 18.

The transmission ratio variable mechanism in the case where the motor control device of the present invention is used for the vehicle steering system including the transmission ratio variable mechanism includes a differential mechanism such as a planetary transmission mechanism and a nutation gear mechanism, and the motor control device of the present invention can be used as a control device of a transmission ratio variable motor that is the electric motor for driving the differential mechanism.

The present invention is also applicable to other general devices that include an electric motor control device.

What is claimed is:

1. A motor control device comprising: a control board for controlling driving of an electric motor, the control board including a multilayer circuit board having at least one inner layer and an outer layer; and a ground pattern disposed continuously in a circumferential direction around an output shaft of the electric motor formed on the at least one inner layer; wherein the entire ground pattern adjacently surrounds the output shaft, the ground pattern having an annular shape; and wherein a severed portion is formed on a part of the ground pattern, so as to sever through the ground pattern in a radial direction of the output shaft; and wherein: the inner layer includes two layers; the other layer of the inner layers is a power supply layer, a power supply pattern disposed continuously in the circumferential direction around the output shaft of the electric motor is formed on the power supply layer, and on a part of the power supply pattern, a severed portion is configured to sever through the power supply pattern in a radial direction of the output shaft; and wherein the power supply pattern is disposed so as to face the ground pattern, and a capacitor is thereby formed by the power supply pattern and the ground pattern.

2. The motor control device according to claim 1, wherein the severed portion formed on the ground pattern and the severed portion formed on the power supply pattern are at substantially the same position in a plan view.

3. The motor control device according to claim 1, wherein:
the multilayer circuit board includes first and second multilayer circuit boards spaced from each other, and
on the first multilayer circuit board, at least a power supply circuit, a calculating circuit, and an analog signal interface circuit are mounted, and on the second multilayer circuit board, at least a driver that controls switching elements and a communication circuit that communicates with the outside are mounted.

4. The motor control device according to claim 1, wherein:
the multilayer circuit board includes first and second multilayer circuit boards spaced from each other, and
at least a power supply circuit, a calculating circuit, and an analog signal interface circuit are mounted on the first multilayer circuit board, and at least a driver that controls switching elements and a communication circuit that communicates with the outside are mounted on the second multilayer circuit board.

5. A vehicle steering system comprising the motor control device according to claim 1.

6. A vehicle steering system comprising the motor control device according to claim 1.

7. The motor control device according to claim 1, wherein the ground pattern has a thin film shape.

8. The motor control device according to claim 7, wherein the ground pattern has an open-ended annular shape surrounding a through hole and is disposed around the output shaft.

9. The motor control device according to claim 1, wherein the ground pattern is provided with a pair of electrode pads, and current flows from the one electrode pad to the other electrode pad.

* * * * *